UNITED STATES PATENT OFFICE 1,975,683

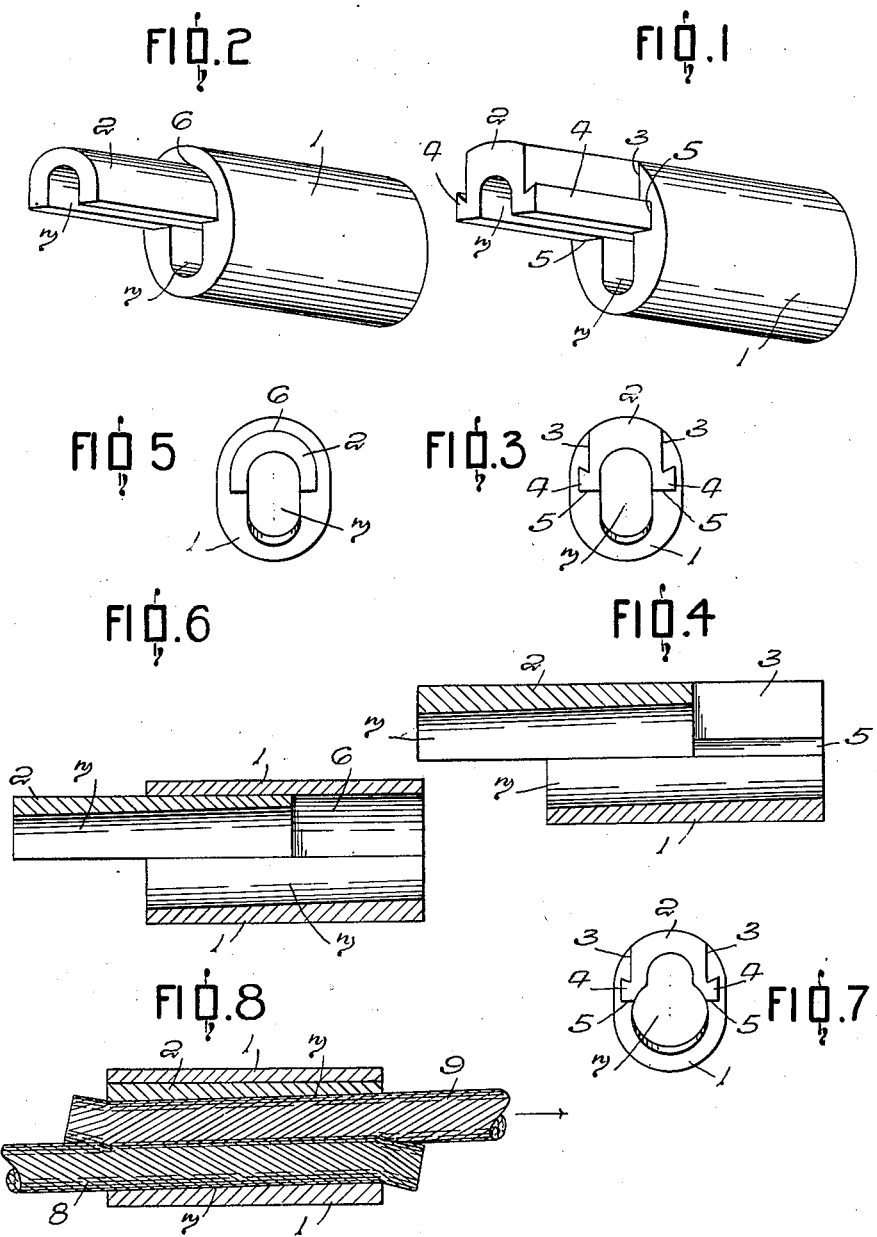

CONNECTING CLAMP FOR WIRES AND CABLES

Henry William Childs, Kaiapoi, New Zealand

Application January 2, 1930, Serial No. 418,129
In New Zealand January 30, 1929

2 Claims. (Cl. 173—303)

This invention relates to a connecting-clamp for wires and cables, the object of the invention being to provide a novel, simple and effective device for use in clamping, splicing, jointing butting and otherwise connecting the same as for example in connecting or splicing the ends of two lengths of wire or cable or for connecting a tap or branch-wire with a main, the said invention being such as to provide a good and satisfactory mechanical and electrical connection and at the same time affording a considerable protection for such joint against corrosion.

In carrying this object into effect the present invention consists briefly of a sleeve divided lengthwise into two members formed longitudinally with mutually receivable slide formations, a bore, for receiving the wires or cables being constituted by corresponding longitudinal grooves formed in the two adjacent faces of the two said members, said bore being parallel throughout, the axis of such bore and the plane of the said slide formations being disposed at a slight angle with one another.

In order that the nature of the invention and its construction may be clearly understood, it will now be fully described and explained with reference to the accompanying drawing, in which:

Fig. 1 is a perspective view of a clamp in accordance with the present invention, illustrating by way of example, one preferred form of the slide formations more especially suitable in cases where a branch-wire or tap is to be connected to an already erected wire or cable, or where two ends are not available.

Fig. 2 is a similar view, illustrating also by way of example, a preferred construction of the slide formations for use generally in cases other than that above mentioned as for instance where two lengths of wire or cable are to be jointed together.

Figs. 3 and 4 are respectively an end view and a longitudinal section of a clamp as shown in Fig. 1.

Figs. 5 and 6 are respectively an end-view and a longitudinal section of a clamp as in Fig. 2.

Fig. 7 is an end-view of a clamp similar in general construction to that of Fig. 1 but having its bore arranged for the reception of two wires or cables of different diameters, and, Fig. 8 is a longitudinal section of a clamp of the form shown in Fig. 2, illustrating its action in jointing two lengths of cable.

The construction comprises a sleeve divided lengthwise into two members 1 and 2 formed longitudinally with mutually receivable slide formations whereby the member 2 may be slid within the member 1.

The said members and their slide formations may take different forms.

Thus for example, as here shown in Figs. 1, 3, 4 and 7, the member 1 is formed with a longitudinal gap or opening 3 to accommodate the member 2 which latter is formed with out-turned flanges 4 received in inwardly facing grooves 5 in the member 1.

Again the form shown in Figs. 2, 5, 6 and 8, the member 1 is formed to envelop the member 2 the slide formation of the member 2 being constituted by the whole of the external longitudinal surfaces of the latter, while that of the member 1 is constituted by a correspondingly shaped opening 6 extending longitudinally through such member 1 to receive the said member 2.

In all cases however the said slide formations are truly parallel throughout thereby permitting of the member 2 being slid freely through the member 1.

Formed longitudinally through the interior of the sleeve is a bore 7 composed of a pair of longitudinal grooves formed one in each of the opposed surfaces of the two members.

The said grooves may be smooth or serrated and may be compromised in shape to accommodate a diversity of wires or cables of equal or unequal diameters.

The said bore is parallel throughout but its axis and the plane of the said slide formations are disposed at a slight angle of inclination with one another.

That is to say, considering the sleeve from one end to the other, one of the said grooves increases in depth gradually while the depth of the corresponding groove similarly decreases.

The said grooves, constituting the two halves of the bore, therefore approximate to two opposing inclined planes capable of producing a positive compound parallel clamping or wedging effect upon the contained wires or cables.

In practice each of the said grooves, at its deeper end, will be of about the required dimensions to just contain one of the two wires or cables to be jointed, or, in cases where it is intended to clamp but a single wire or cable, approximately one half of the diameter of such wire or cable.

In cases where the clamp is to be employed for jointing two wires or cables of equal diameters the two said grooves will be identical, thus producing a bore of approximately elliptical cross-section as in Figs. 1, 2, 3, 4, 5 and 6 and 8, while in cases where it is desired to join two wires or cables of different diameters, as for instance in connecting a tap-wire to a main, the said bore will be of substantially oval cross section as shown in Fig. 7.

In all cases however the construction is such that, assuming the said guide formations of the member 2 to be entered within those of the member 1 in the correct relation as clearly shown more particularly in Figs. 4 and 6, the action of sliding the member 2 into the corresponding member 1 will cause the diameter of the bore 7, at right angles with the division between its two composing grooves, that is to say its major diameter as here shown, to gradually decrease while preserving the parallelism of such bore.

In operation the portions of the two wires or cables as 8 and 9 to be connected are laid one within each of the two grooves composing the bore 7, the member 2 being placed with its slide formations just entered in the corresponding slide formations of the member 1.

The member 2 is then forced into the member 1, as by hammering opposite ends of such members or by applying to such ends a suitable clamping tool, thereby reducing the major diameter of such bore which in consequence compresses the contained portions of the wires or cables into tight and firm contact with one another, as shown in Fig. 8, thereby producing a good mechanical and electrical joint which on account of the close fitting of the bore will be to a great extent protected from the air and so have little liability to corrosion.

In making the joint in this manner it is necessary to so arrange the sleeve that the strain, indicated by the arrows Fig. 8, to which the wires or cables are subject will tend to draw the members 1 and 2 still further in the said tightening direction.

It will be appreciated that the construction here illustrated in Figs. 1, 3, 4 and 7 affords the advantage that in the case of an already erected wire or cable, or where the two ends are not available, the same may be placed in position within the groove of the member 1 by passing it through the gap 3. Where this is not necessary however, as for instance in the case between the ends of two wires or cables, as in Fig. 8, the construction shown in Figs. 2, 5, 6 and 8 is preferable as being mechanically stronger.

It will be understood that where desired two or more of the said clamps may be conjoined, as by casting their portions 1 in one piece and suitably disposed in relation to each other thereby to enable a plurality of wires or cables extending parallel or at any desired angles with one another to be united.

I claim:

1. A two-part clamp for connecting electrical wires and cables in superimposed relation; one part comprising a casing member provided with a longitudinal bore from end to end and of different dimensions on opposite sides of a longitudinal median plane through the casing, said bore at one side of said plane being substantially semi-cylindrical and of uniform size through its extent and having its chord in said median plane, said bore at the other side of said median plane being shaped as a channel reduced with respect to the other side of said median plane and communicating therewith throughout its extent, said channel having side walls equidistantly spaced through its length and having a curved bottom increased in depth from one end to the other; and the other clamp part comprising a member insertable in one end of said substantially semi-cylindrical portion of the bore and shaped in cross section to correspond thereto, said insertable member being slidable longitudinally within the casing and having a channel opposed to the casing channel and counterpart thereto, and the increasing depth being reversed with respect to said casing channel.

2. A two-part clamp for connecting electrical wires and cables in superimposed relation; one part comprising a casing member having a greater length than width and provided with a longitudinal bore from end to end and of different dimensions on opposite sides of a longitudinal median plane through the casing, said bore at one side of said plane being substantially semi-cylindrical and of uniform size throughout its extent and having its chord in said median plane, said bore at the other side of said median plane being shaped as a channel reduced with respect to the other side of said median plane and communicating therewith throughout its extent, said channel having side walls equidistantly spaced throughout its length and having a curved bottom increased in depth from one end to the other; and the other clamp part comprising a member insertable in one end of said substantially semi-cylindrical portion of the bore and shaped in cross section to correspond thereto, said insertable member being slidable longitudinally within the casing and having a channel opposed to the casing channel and counterpart thereto, and the increasing depth being reversed with respect to said casing channel.

HENRY WILLIAM CHILDS.